(12) United States Patent
Ramachandran et al.

(10) Patent No.: US 8,873,426 B2
(45) Date of Patent: Oct. 28, 2014

(54) WIRELESS NETWORK CONNECTIVITY IN DATA CENTERS

(75) Inventors: Kishore Ramachandran, North Brunswick, NJ (US); Ravindranath Kokku, Monmouth Junction, NJ (US); Rajesh Mahindra, Monmouth Junction, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 910 days.

(21) Appl. No.: 12/499,906

(22) Filed: Jul. 9, 2009

(65) Prior Publication Data

US 2010/0172292 A1 Jul. 8, 2010

Related U.S. Application Data

(60) Provisional application No. 61/079,483, filed on Jul. 10, 2008.

(51) Int. Cl.
*H04L 12/28* (2006.01)
*H04W 4/00* (2009.01)
*G06F 15/16* (2006.01)
*H04W 84/10* (2009.01)

(52) U.S. Cl.
CPC .................................... *H04W 84/10* (2013.01)
USPC ............ 370/254; 370/328; 709/200; 709/203

(58) Field of Classification Search
USPC ........................... 370/310, 338; 709/203, 223
See application file for complete search history.

(56) References Cited

U.S. PATENT DOCUMENTS

| | | | |
|---|---|---|---|
| 2002/0034958 A1* | 3/2002 | Oberschmidt et al. ........ | 455/517 |
| 2004/0260745 A1* | 12/2004 | Gage et al. .................... | 709/200 |
| 2005/0136841 A1* | 6/2005 | Frank .............................. | 455/65 |
| 2005/0188092 A1* | 8/2005 | Short et al. .................... | 709/227 |
| 2007/0027948 A1* | 2/2007 | Engebretsen ................. | 709/203 |
| 2008/0133915 A1* | 6/2008 | Tanaka et al. ................. | 713/171 |
| 2008/0186667 A1* | 8/2008 | Verdiell et al. ................ | 361/686 |
| 2008/0195756 A1* | 8/2008 | Galles ........................... | 709/245 |
| 2009/0028177 A1* | 1/2009 | Pettus et al. .................. | 370/463 |
| 2009/0219536 A1* | 9/2009 | Piazza ........................... | 356/445 |
| 2009/0274063 A1* | 11/2009 | Guo et al. ..................... | 370/254 |

* cited by examiner

*Primary Examiner* — Brandon Renner
(74) *Attorney, Agent, or Firm* — Joseph Kolodka

(57) ABSTRACT

A method for wireless network connectivity in a data center includes communicating between nodes in a data center across a wireless interconnectivity through artificially created paths between nodes in the data center, the nodes being at least one of a server, router, switch, and other such components in the data center that require connectivity; and managing the wireless interconnectivity by a control and management entity.

21 Claims, 3 Drawing Sheets

WIRELESS NETWORK CONNECTIVITY IN DATA CENTERS

This application claims the benefit of U.S. Provisional Application No. 61/079,483, entitled "60 GHz Data-Center Networking: Wireless—Worry less?" filed on Jul. 10, 2008, the contents of which is incorporated by reference herein.

The present invention relates generally to wireless communications, and more particularly, to using wireless communications for network connectivity in data centers.

BACKGROUND OF THE INVENTION

In recent years, data centers have seen a significant growth due to their cost effectiveness. With increased number of services hosted in data centers, higher processing requirements for services (such as web 2.0, search, GFS, MapReduce, etc.) and space constraints, the density of servers per unit area has increased significantly.

Traditionally, the servers in the data centers have been connected by wires for networking. However, with increasing density of servers and other devices within data centers, wired link connectivity has led to denser cabling networks that engender several challenges, e.g., FIG. 1. Apart from necessitating significant manual effort in connecting these servers and keeping accurate per-cable information for maintenance and troubleshooting, these network cables additionally affect data center cooling. Cable bundles behind/between server racks, even with structured cabling such as in FIG. 2, or under raised floors can cause airflow blockages leading to inefficient cooling and increased energy consumption. Finally, cables take up substantial space, which can otherwise be used for accommodating more servers.

Several data centers manage the ill-effects of unstructured cabling, as shown in FIG. 1, by putting more structure, as in FIG. 2, and naming each wire carefully to locate quickly which two points a wire connects. This structured cabling, however, still requires significant manual effort, and causes issues with cooling. For instance, FIG. 2 shows that even with structured cabling, cables block the servers substantially making cooling of the equipment difficult. Several third-party cabling services specialize in designing structured wire placement that is tailored to the requirements of a data center but unnecessary space is still wasted and inefficient cooling still exists with these customized cable structures.

Accordingly, there is a need for network connectivity in a data center that reduces network cables, reduces complexity of setup and maintenance of the data center as well as allowing for efficient cooling requirements for components in the data center thereby reducing energy use.

SUMMARY OF THE INVENTION

In accordance with the invention, a method for wireless network connectivity in a data center includes communicating between nodes in a data center across a wireless interconnectivity through artificially created paths between nodes in the data center, the nodes being at least one of a server, router, switch, and other such components in the data center that require connectivity; and managing the wireless interconnectivity by a control and management entity. Preferably, the wireless interconnectivity includes the wireless spectrum 57-74 GHz, at least one of a line of site wireless communication path and a non-line-of-sight path with a reflector, and the control and management entity comprises at least one of an alternate control plane connectivity, a network virtualization at a control level, a network virtualization at a node level and beam selection and steering on the nodes.

In accordance with an alternative embodiment of the invention, a system for wireless network interconnectivity in a data center includes wireless interconnectivity in a data center through artificially created communication paths between nodes in the data center, the nodes being at least one of a server, router, switch, and other such components in the data center that require connectivity; and a control and management entity for managing the interconnectivity.

BRIEF DESCRIPTION OF DRAWINGS

These and other advantages of the invention will be apparent to those of ordinary skill in the art by reference to the following detailed description and the accompanying drawings.

DETAILED DESCRIPTION

Figure 1:
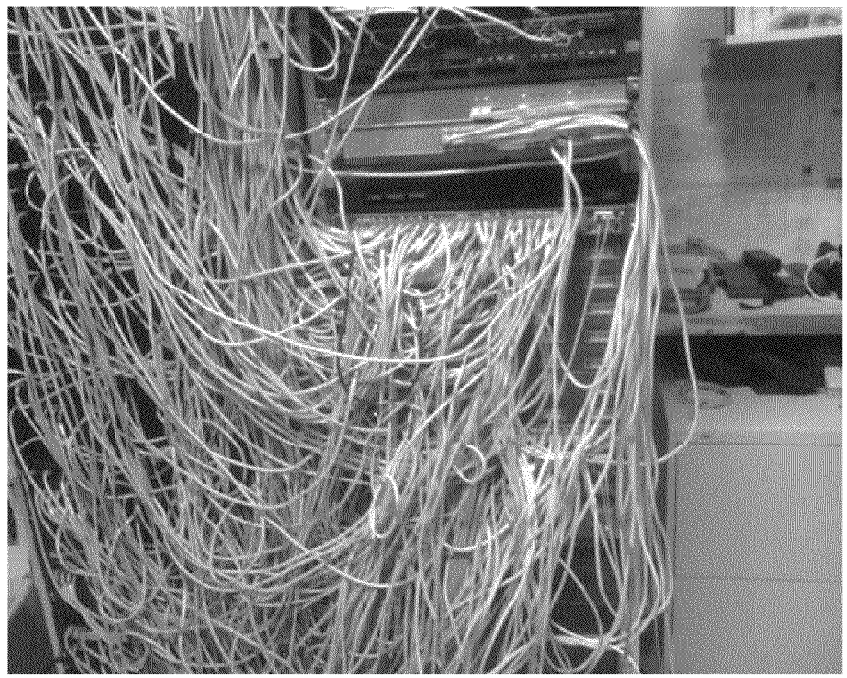
FIG. 1 illustrates current cable based network connectivity in a data center.
Figure 2:
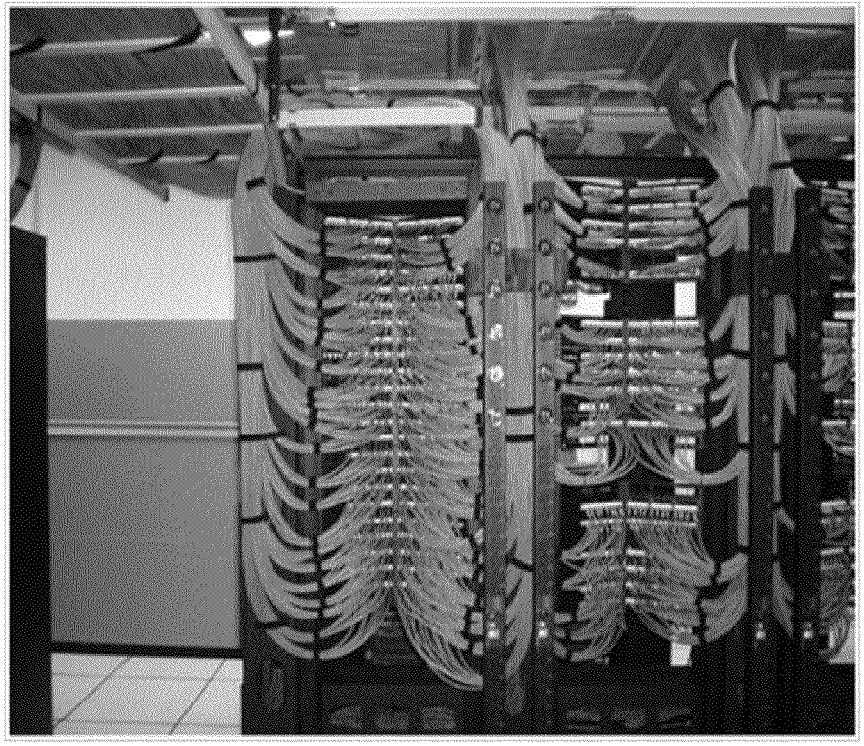
FIG. 2 illustrates alternative current cable based network connectivity in a data center.
Figure 3:
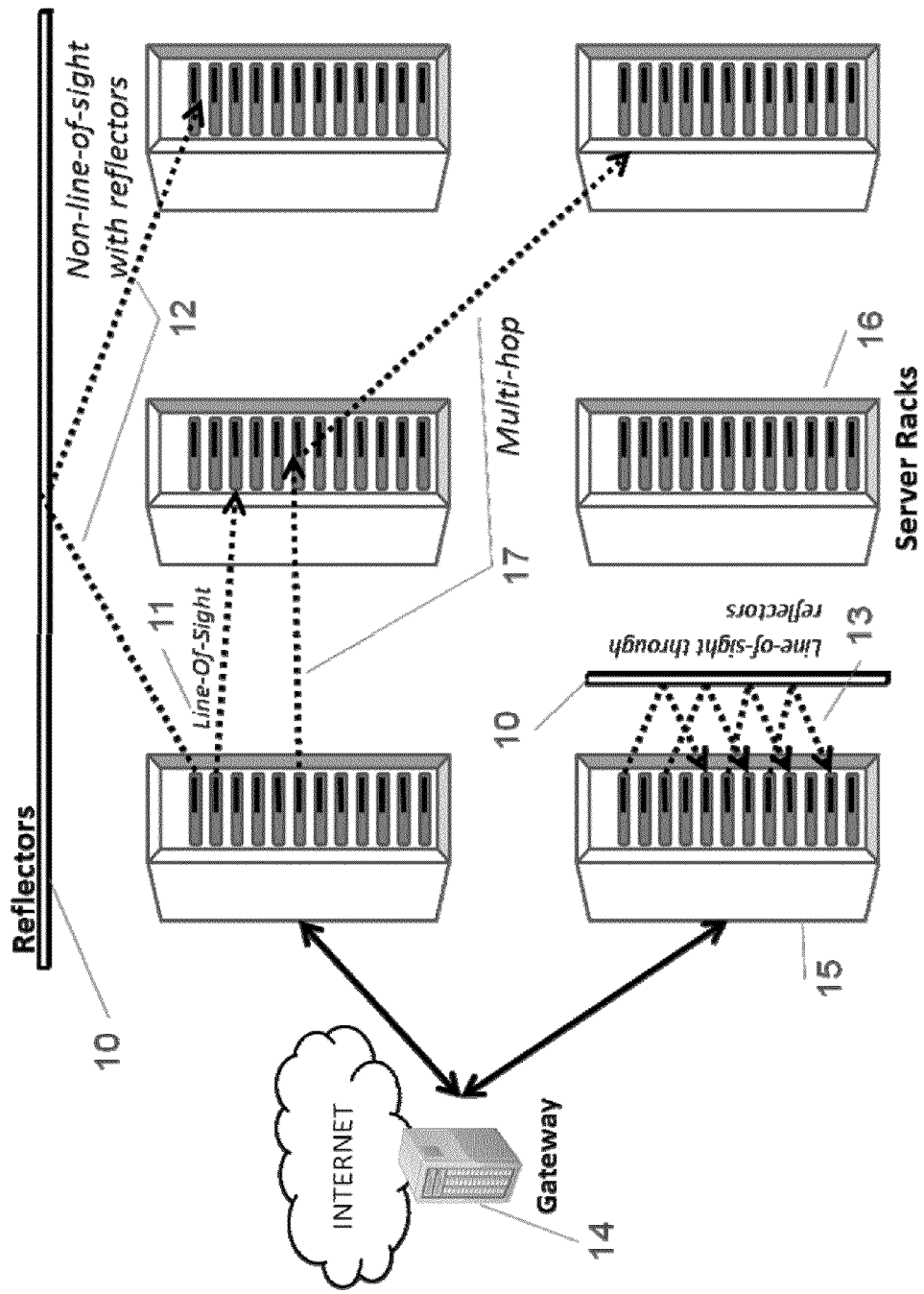
FIG. 3 is a diagram of exemplary wireless network connectivity in accordance with the invention.
Figure 4:
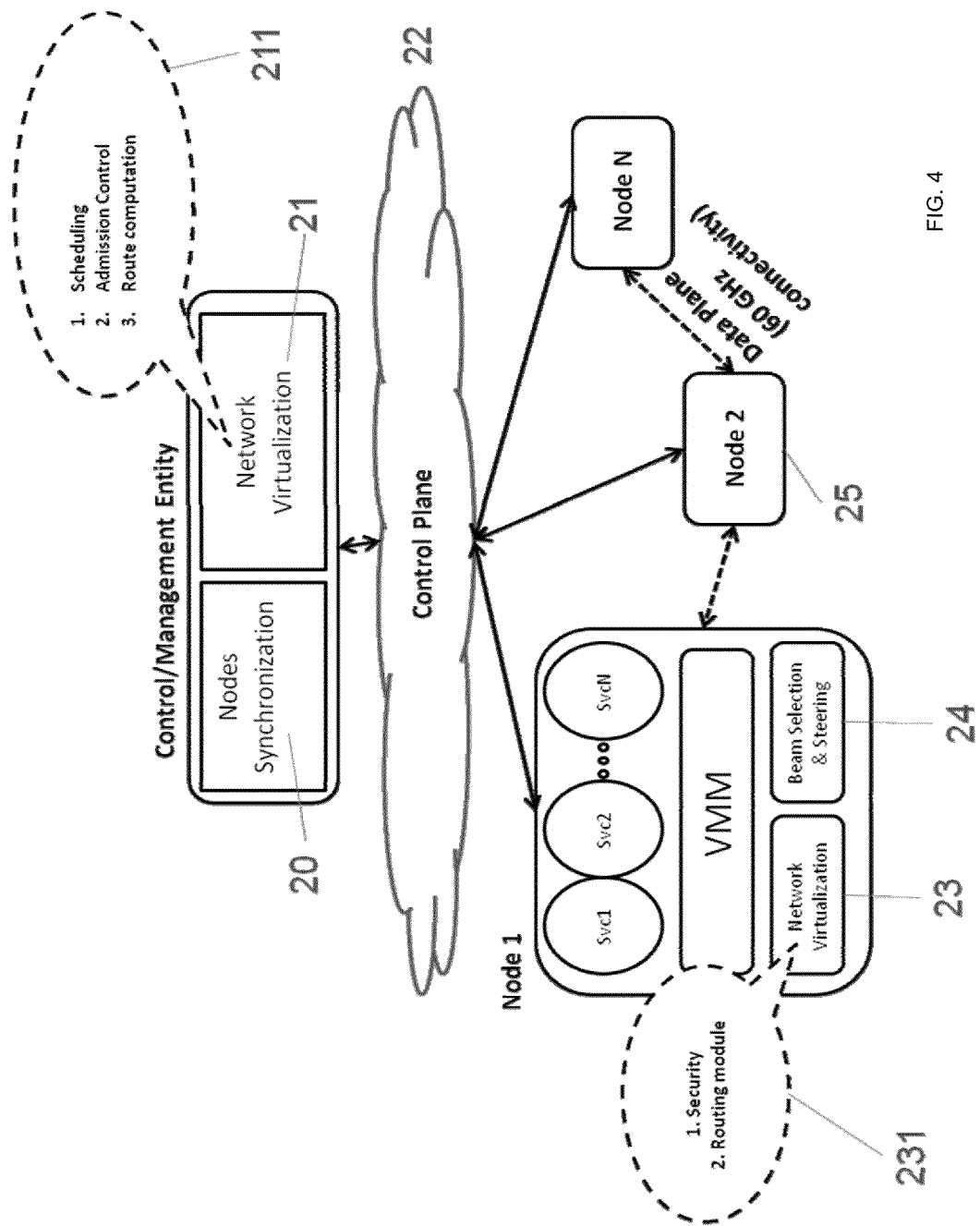
FIG. 4 is a diagram of an exemplary architecture for wireless network connectivity in accordance with the invention.

The invention is directed to using wireless technology in the 60 GHz range to connect servers, switches and other such components in data centers, thereby reducing or eliminating network cables inside a data center. Using wireless instead of wires for connectivity in data centers reduces complexity of setup and maintenance of data centers and reduces the cooling requirements of components. As a result, it also reduces the cost of operating data centers. FIG. 3 is a diagram of exemplary wireless network connectivity in accordance with the invention. FIG. 4 is a diagram of an exemplary architecture for wireless network connectivity in accordance with the invention.

The inventive connectivity in a data center achieves network connectivity between several components in the data center through wireless technology in the unlicensed spectrum between 57-64 GHz. Radios operating in this band have unique characteristics that make this invention a plausible solution. Regulations in this spectrum allow a combination of large bandwidth (2500 MHz per channel) and high allowable transmit power (up to 8 W), which implies that speeds of up to multiple Giga bits per second can be achieved reliably. The inherent directivity of transmissions at this frequency results in reduced interference, increased isolation and hence, improved security. Since the wavelength at these frequencies is around five millimeters, antenna element sizes are correspondingly small. This makes it possible to integrate the entire transceiver, including the antennas, onto a single chip with a small form-factor, a configuration not achievable by any other wireless technology (such as 802.11) or system so far.

The diagram in FIG. 3 shows different instantiations of wireless connectivity in data centers between servers, routers, switches and other such components. In what follows, we will use the term node to represent a server, router, switch, and other such components in the data center that require connectivity. Nodes on different racks 16 can communicate through line-of-sight (LOS) path as in 11. Nodes on the same rack may communicate through a reflector 10 as shown by 13. Due to space constraints, a LOS path may not be available for several servers on different racks. To facilitate communication in such scenarios, the data center may be provisioned with rack-mounted, wall-mounted or ceiling-mounted reflectors 10. A description of exemplary reflectors has been disclosed in European Patent Application 07110884.9: (EP 1830488 A1), entitled, "Indoor wireless communication system using active reflector, and incorporated herein by reference. Such a path is shown as 12. In scenarios where either a LOS path or a path through reflectors is not available, multihop paths 17 through multiple intermediate servers may be used. Nodes may be connected to the external Internet using wires 15 through Gateway 14.

An exemplary architecture for carrying out the inventive wireless network connectivity, as shown in FIG. 4, includes a number of components: Nodes Synchronization 20, Network Virtualization 21 at a control management level with scheduling, admission control and route computation 211, a Control Plane 22, Network Virtualization 23 at a node level with security and routing functions 231, and a beam selection and steering 24 component.

The control plane 22 with an alternative connectivity technology is for exchanging information related to synchronization of the nodes 25; scheduling and routing of the various flows across the nodes. The central control/management framework is also responsible for admission control and resource management for the various services running across the data center. Such centralized control architecture eases design and manageability.

The Nodes Synchronization 20 across nodes helps schedule transmissions. Time synchronization among the nodes helps schedule collision-free transmissions on common wireless access channels.

Beam Selection and Steering module 24. Initial beam selection and steering on the individual nodes to select the thinnest beam possible to ensure minimum interference to other transmissions. Time synchronization across nodes will ensure co-ordination of beam selection among different transmitting and receiving nodes.

Network virtualization at the control/management plane level 21. Wireless network virtualization provides several components 211: (a) Admission control: Data Centers are shared by multiple concurrently running services. The admission control entity performs network resource management in order to map new services onto nodes such that the desired guarantees and quality of service QoS are met. (b) Scheduling: Scheduling traffic from various distinct services at individual nodes to maximize number of non-interfering transmissions per unit time while meeting certain delay/bandwidth guarantees between two nodes. And (c) Multi-hop route computation to connect two arbitrary nodes that cannot be directly connected:

Network virtualization 23 at the node level contains two modules 231: (a) security and (b) routing. Security techniques at the virtual machine monitor (VMM) level protect content exchanged between two servers from being decodable at other undesired nodes where the transmitted signals reach. The routing module on each node masks off from the services the presence of multi-hop connectivity between two servers.

From the above description and associated FIG. 3-4, it can be seen that the inventive use of wireless technology in the 57-64 GHz spectrum for connectivity in data centers reduces or eliminates cabling. The use of reflectors in data centers (on the walls, floor and ceiling, in the racks, etc.) artificially creates paths between two nodes in the data center that can be used for direct connectivity. The inventive technique/system employs a control/management entity for managing wireless connectivity between nodes in the data center. The control/management entity connects through an alternative technology such as wired Ethernet, 802.11, or a low rate channel in wireless HD, etc. to all nodes in the data center. Alternative connectivity is to ensure a more reliable control path between servers, and for failover, that may not be possible always in the 60 GHz range. The invention includes achieving network virtualization through operations at the control/management entity. The invention includes determining a schedule of non-interfering transmissions over a synchronized slotted framework to ensure maximum number of non-interfering transmissions per unit time while meeting certain delay/bandwidth guarantees between two nodes. The invention use of wireless multi-hop connectivity in data centers is effective in non-line-of-sight environments.

The invention employs route computation to address the issue of determining dynamically the best route to connect two servers using a combination of multiple direct (point-to-point) connections between servers. The invention employs restricting number of services deployed on a node based on the effective performance (such as bandwidth or delay) that can be guaranteed by network virtualization. The invention includes virtualizing network connectivity at the node level, using security techniques between any two nodes in the data center to ensure that wireless transmissions between any two nodes are not interpretable at other nodes, and employs a routing module on each node to assist in multihop routing. The nodes may use a routing protocol to relay packets through multiple intermediate nodes.

The present invention has been shown and described in what are considered to be the most practical and preferred embodiments. It is anticipated, however, that departures may be made from herein and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. A method for wireless network connectivity in a data center comprising the steps of:
    communicating between nodes in a data center across a wireless interconnectivity through artificially created paths between nodes in the data center, the nodes being switches located in racks in the data center each connected to servers in the rack;
    managing the wireless interconnectivity by a control and management entity; said nodes are using a line-of-sight wireless communication path or a non-line-of-sight wireless communication path to enable communication of control and data packets between said switches, said communication comprising communication between switches on different racks;
    providing an admission control entity performs network resource management in order to map new services onto nodes to meet a quality of service;
    scheduling traffic from distinct services at individual nodes to maximize number of non-interfering transmissions per unit time while meeting predetermined delay and bandwidth guarantees between two nodes; and
    performing beam selection and steering and multi-hop route computation to select beams for the said wireless communication paths with a predetermined minimum interference to other transmissions on other wireless communication path.

2. The method of claim 1, wherein the intermediate nodes form a sequence of line-of-sight wireless links and at least one of the intermediate nodes forms a line-of-sight wireless link with each of the nodes.

3. The method of claim 1, wherein the control and management entity comprises at least one of an alternate control plane connectivity, a network virtualization at a control level, a network virtualization at a node level and beam selection and steering on the nodes.

4. The method of claim 3, wherein the alternate control plane connectivity comprises an alternative connection to a 57-74 GHz wireless spectrum connection to all nodes in the data center to ensure a reliable control path between servers, and for failover, that may not be possible always in the 57-74 GHz wireless range.

5. The method of claim 4, wherein the alternate control plane connectivity comprises one of an Ethernet, 802.11, or a low rate channel in wireless high-definition HD to all nodes in the data center.

6. The method of claim 3, wherein the network virtualization at a control level comprises multihop routing computation to connect two arbitrary nodes that cannot be directly connected.

7. The method of claim 3, wherein the network virtualization at a control level comprises admission control in that data centers are shared by multiple concurrently running services and the admission control performs network resource management in order to map new services onto the nodes such that the desired guarantees and quality of service are met.

8. The method of claim 3, wherein the network virtualization at a node level comprises security controls on each node to protect content exchanged between two nodes from being decodable at other nodes where transmitted signals reach.

9. The method of claim 3, wherein the network virtualization at a node level comprises routing controls on each node to mask off from the services the presence of multi-hop connectivity between two servers.

10. The method of claim 3, wherein the beam selection and steering comprises selecting the thinnest beam possible to ensure a predetermined low level of interference to other transmissions with time synchronization across the nodes ensuring co-ordination of beam selection among different transmitting and receiving nodes.

11. The system of claim 1, comprising time synchronizing across nodes for coordination of beam selection among different transmitting and receiving nodes.

12. A system for wireless network interconnectivity in a data center comprising:
wireless interconnectivity in a data center through artificially created communication paths between nodes in the data center, the nodes being switches located in racks in the data center each connected to servers in the rack; and
a control and management entity for managing the interconnectivity and network resource management to map new services onto nodes to meet a quality of service and scheduling traffic from distinct services at individual nodes to maximize number of non-interfering transmissions per unit time while meeting predetermined delay/bandwidth guarantees between two nodes;
a line-of-sight wireless communication path or a non-line-of-sight wireless communication path to enable communication of control and data packets between said switches, said communication comprising communication between switches on different racks, wherein the nodes perform beam selection and steering and multihop route computation on individual nodes to select beams for the said communication paths with a predetermined minimum interference to other transmissions on other wireless communication paths.

13. The system of claim 12, wherein the wireless interconnectivity comprises at least one of a line of site wireless communication path and a non-line-of-sight path with a reflector.

14. The system of claim 12, wherein the control and management entity comprises at least one of an alternate control plane connectivity, a network virtualization module at a control level, a network virtualization module at a node level and beam and selection steering module.

15. The system of claim 14, wherein the alternate control plane connectivity comprises an alternative connection to a 57-74 GHz wireless spectrum connection to all nodes in the data center to ensure a reliable control path between servers, and for failover, that may not be possible always in the 57-74 GHz wireless spectrum.

16. The system of claim 14, wherein the alternate control plane connectivity comprises one of an Ethernet, 802.11 and a low rate channel in wireless high-definition HD to all nodes in the data center.

17. The system of claim 14, wherein the network virtualization module at a control level comprises multihop routing computation to connect two arbitrary nodes that cannot be directly connected.

18. The system of claim 14, wherein the network virtualization module at a control level comprises admission control in that data centers are shared by multiple concurrently running services and the admission control performs network resource management in order to map new services onto the nodes such that the desired guarantees and quality of service are met.

19. The system of claim 14, wherein the network virtualization module at a node level comprises security controls on each node to protect content exchanged between two nodes from being decodable at other nodes where transmitted signals reach.

20. The system of claim 14, wherein the network virtualization module at a node level comprises routing controls on each node to mask off from the services the presence of multi-hop connectivity between two servers.

21. The system of claim 14, wherein the beam selection and steering module comprises selecting the thinnest beam possible to ensure a predetermined low level of interference to other transmissions with time synchronization across the nodes ensuring co-ordination of beam selection among different transmitting and receiving nodes.

* * * * *